March 27, 1962  B. D. EYTINGE  3,026,885
APPARATUS FOR PRODUCING POTATO CHIPS AND THE LIKE
Original Filed March 18, 1958
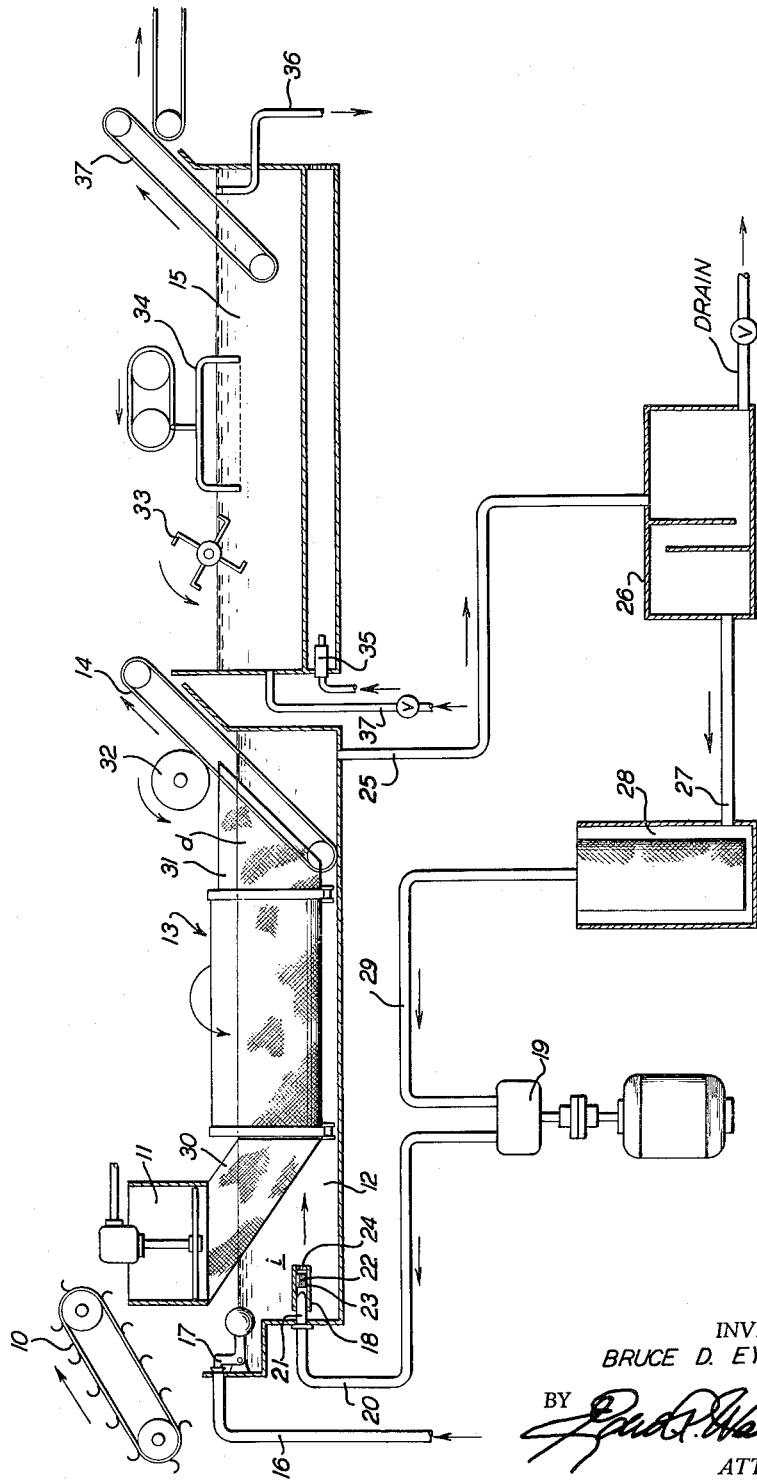
INVENTOR.
BRUCE D. EYTINGE
BY
ATTORNEY

United States Patent Office 3,026,885
Patented Mar. 27, 1962

3,026,885
APPARATUS FOR PRODUCING POTATO CHIPS AND THE LIKE
Bruce D. Eytinge, near San Antonio, Tex., assignor to The Frito Company, Dallas, Tex., a corporation of Texas
Original application Mar. 18, 1958, Ser. No. 722,205. Divided and this application Oct. 22, 1958, Ser. No. 801,981
5 Claims. (Cl. 134—157)

The present invention relates to an improved apparatus for the production of potato chips and is a division of my copending application Serial No. 722,205, filed March 18, 1958, now matured into Patent No. 2,886,439.

It has been the aim and common endeavor for a long time, of those engaged in the manufacture of potato chips, to obtain superior quality end product—that is, potato chips having a uniform color, a tender texture, yet firm or crisp, and a longer shelf-life. However, efforts in this respect have been hampered by many factors, among which are the quality of the potato to be processed, the tendency of mechanical slicers to tear through the potato resulting in very rough slices, the residual starch left on the surfaces of the slices due to slicing, the enzyme or other chemical action on the potato slices resulting from said slicing—all of which affects the color, tenderness and the shelf-life of the finished product.

It is common knowledge that, in order to obtain a good quality potato chip, (1) it is necessary to hold the amount of loose starch clinging to the potato slices to a minimum; and (2) that mechanical slicing devices have a tendency to tear through the potato leaving fragments of the cell walls and inter-cellular fibres thereon, making a very rough slice. This residual starch seems to form a skin, when the potato slice is fried, and the resulting chip is often unevenly cooked with a poor or mottled color from a yellow to a dark brown. This skin appears to prevent the uniform escape of water from the slices during the cooking operation, as well as to prevent the uniform absorption of the cooking oil into the slices during the cooking operation.

Various attempts have been made to remove this free starch and the ragged or fragmented particles from the surfaces of the slices, some with partial success and others without success. For instance, the general practice has been to employ two washing baths, one which tumbles the slices to strain off small undesirable pieces of potato and the other employing jets of water to wash the surfaces of the individual potato slices of free starch and jagged particles thereon.

The object of the present invention is to provide at least one apparatus by which the method described in my aforesaid Letters Patent may be performed to remove from the surfaces of potato slices, in the production of fried potato chips, all free starch and fragments of cell walls and intercellular fibre thereon, to mechanically fatigue the cell walls and intercellular fibres and supporting structure of the potato slice for effectively tenderizing the potato slice and to arrest the action of those enzymes which tend to produce the undesirable sugars in an uneven distribution throughout the slice—all resulting in an improved potato chip having a uniform color and texture with a noticeable tenderness than heretofore and having an increased shelf-life.

A further object of this invention is to treat potato slices, prior to the cooking of the same in the manner just mentioned in the preceding object, in a single bath or wash tank, and then deliver the slices from said bath or tank directly to the cooking vat, thereby eliminating the necessity for subsequent or a second washing operation.

Other objects will be apparent and a full understanding of the present invention may be had from the following description of the preferred embodiment of the invention, as now devised and used, and which will explain more in detail its advantages.

The accompanying drawing, which forms a part of this description by reference, illustrates one form of the apparatus by which the above stated objects may be attained and in which the said apparatus is shown in a single view in side elevation with parts in section to illustrate details of construction and arrangement of elements.

With reference to the drawing, potatoes, that have been washed and peeled, are delivered to a conveyor 10 from which they are discharged into a slicer 11 which cuts the potatoes into slices ranging between $\frac{1}{18}$ to $\frac{1}{24}$ of an inch in thickness according to the type of potato or the chip desired for the market. Potato slices drop from the slicer 11 into a water tank 12 which has a horizontally disposed cylindrical strainer 13 mounted therein to rotate on its horizontal axis and to be at least partially submerged therein. The water used in the tank 12 is at normal temperature, as received from a usual source of city supply or from a well (i.e. 70° F. plus or minus), and flows in such a manner as to cause the potato slices to move along its length into one end of the revolving cylindrical strainer 13. The strainer 13 is foraminous and small undesirable pieces of potato slices pass through its screen-like wall, together with any waste potato products, the larger slices passing from the other end of the cylinder where they are carried by an endless belt 14 and discharged into a cooking vat 15.

The water tank 12, cylindrical strainer 13, and conveyor 14 are conventional in apparatus, now usually employed, with the water in the tank 12 being re-circulated and the tank being provided with a make-up supply 16 controlled in a suitable manner, as indicated by the float valve 17.

However, in order to guide the potato slices from the slicer 11 to the cylindrical screen 13 a foraminous chute 30 is interposed between the discharge end of the slicer and the intake end *i* of the screen or strainer 13. Likewise, a foraminous guide 31 is provided between the discharge end *d* of the cylindrical strainer 13 and the conveyor 14 to direct the passage of the potato slices from the strainer 13 onto the conveyor 14.

A sonic transducer 18 is disposed in the forward end of the tank 12 below the water level therein and in advance of the intake end *i* of the screen strainer 13. This transducer 18 may be, and preferably is, of the reed type actuated by a jet of water, under pressure, produced by a pump 19 and delivered to the transducer 18 through the conduit 20 having a nozzle 21 positioned to direct its water jet on a vibratory reed 22 mounted in a cylindrical housing 23 having a discharge opening 24 directing its discharge toward the screening and tumbling strainer 13. Thus, the discharge from the transducer 18 of the water, under pressure from the pump 19, causes a rapid flow of the water through the tank 12—and hence through cylindrical strainer 13—from the forward end of the tank 12 toward the endless conveyor 14 at the rear end portion of the tank 12, where the wash water is conveyed by a conduit 25 to a settling trap 26, from whence it is drawn through pipe 27 to a filter 28 by the pump 19 connected to the filter by pipe 29, thus re-circulating clean filtered water to the tank 12 actuating the transducer 18. In the arrangement shown, the pump 19 not only circulates and recirculates the filtered water in the tank 12 but actuates the sonic transducer 18.

While I have illustrated a reed-type ultrasonic transducer, any other type may be employed that may be disposed internally or externally of the tank 12; provided, that the amplitude of the emitted sonic energy, transmitted to the liquid within said tank, has an intensity sufficient to cause cavitation of the liquid in the tank at the point of said emission thereinto as such cavitation is sufficient to fulfill the requirements to attain the above stated objects of this invention, if this cavitation is properly related to the movement of the slices through or in the wash-liquid, although some transducers may not accelerate the flow of the water in tank 12 as does the reed type described above. In such instances, the circulation is still supplied by suitable means such as the pump 19.

As the potato slices pass upwardly on the conveyor belt 14, a compressor roller 32 presses any excess water from the potato slices on the belt and the water drains back into the tank 12. The potato slices, so treated, are then discharged from the conveyor belt 14 into the cooking vat 15 equipped with the usual circulating paddle 33 and rake 34.

The cooking vat 15 contains an edible cooking oil maintained at the desirable cooking temperature by a burner 35. The oil may be re-circulated, for the purpose of filtering it to remove any waste therefrom, as indicated at 36 and 37. The cooked potato slices are removed from the cooking vat 15 by an endless belt 37, which discharges them from the apparatus onto a conveyor 38 for delivery at a packaging station, not shown.

Cavitation—as employed herein in describing this invention—means the formation of a void in a liquid by mechanical vibration and is employed to define a measure of the total energy imparted into the treating system by mechanical vibration. Cavitation occurs independent of vibratory frequencies, that may be produced, so long as there is sufficient energy to overcome the absolute pressure on the liquid, in which the cavitation occurs, plus the coercive force of the molecular structure of said liquid. Thus, the term "cavitation" is used herein to define an energy level, as it is a more convenient way of expressing the energy level required and which is caused by mechanical vibrations in a liquid. Cavitation may be caused by vibrational frequencies from about 600, or less, to 60,000 cycles, or more, per second, or at any frequency in between those mentioned and produces sufficient energy to process potato slices in accordance with this invention. The time of operation will depend upon the extent of cavitation and, also, the distance of the slices from the source of energy or the resulting cavitation.

However, such "vibrational frequencies" are generally defined as sub-audible, audible and above audible, the latter including that which is often referred to as supersonic and ultra-sonic and are generally above 16,000 cycles per second and are not audible to the human ear. Under certain conditions sonic frequencies may be employed below 16,000 cycles per second, but I have found that these frequencies are not the best for the most efficient operation and, further, they are audible and annoying in the factory. I found that the highest efficiency is obtained, in the treatment of potato slices with the arrangement and location of the elements, as shown, for the purposes of this invention, when such frequency range is in the order of 20,000 cycles, which is ultrasonic. Since the energy distribution in the liquid is not uniform but decreases as the distance from the transducer 18 to the slices, under treatment, increases, the potato slices are moved through a continually decreasing vibrational field, so that—should this field be an ultra-sonic—the maximum intensity of that field is not sufficient to destroy the potato slices but the average intensity is sufficient to treat the potato slices, in the manner above stated, within the time period the slices remain in said field.

By subjecting potato slices to the action of the sonic transducer 18, in the manner above set forth, while the slices are moved or floated away from the cavitation in the wash-liquid, caused by said transducer, the results are (1) residual starch and fragmental particles on the surfaces of the potato slices are loosened and dispersed efficaciously from said surfaces in a minimum of time and their intercellular fibres or cell walls are weakened without causing disintegration or collapse of their structure, irrespective of the quality of the potatoes used (provided, of course, that they are unspoiled and edible); and (2) the finally finished product (i.e. the fried potato chips) has a much more noticeable tenderness, a more even texture and cook more evenly in the frying oil, resulting in the potato chips having a more uniform color, and longer shelf-life than do potato chips whose slices have not been subjected to the ultrasonic treatment.

Since the actual cleansing action of the potato slices by the ultrasonic energy, as above described, is very rapid, the tank 12 may be only large enough to accommodate the rotating cylindrical strainer 13, where one is employed to remove small slices and waste residue before the desired slices proceed to the conveyor 14 and the cooking vat 15, there being no need for subsequent slice-washing tanks. This, of course, results in a saving of water, equipment and floor space. Should other type of means, other than the cylindrical screen strainer 13, be employed to separate the residue from the desired slices, or none at all the tank 12 may be reduced further in size—that is, to less than half of its size, indicated in the drawing.

As previously stated, the potato slices may be effectively treated in about one (1) second to give the desired end results, when the slices are in the liquid of tank 12 and in close proximity with the transducer 18. However, it is well known that the ultrasonic energy transmitted to the liquid dissipates rather rapidly as the distance is increased from the transducer; and, since the rotary strainer 13 requires a tank of rather large size, the transducer is positioned relative thereto (as generally indicated in the drawings) to compensate for the time slices are resident in the tank, and moved away from the transducer, without damage to the slices but accomplishing the results intended. Consequently, should a different arrangement be employed from that shown and described, an adjustment of the amplitude of the ultrasonic vibrations will be required (as for instance, in the present showing, by varying the fluid pressure to the transducer 18) to supply sufficient energy to perform the functions above described.

Having thus described the invention and the manner in which it is to be performed, it is manifest that the objects of the invention have been attained; but it is to be understood that the invention is not to be restricted to the exact form shown and described as it is susceptible of modifications and variations as fall within the scope of the appended claims.

That which is claimed, as new and to be secured by Letters Patent, is:

1. In a potato-chip producing apparatus, the combination with a wash-tank for slices of potatoes adapted to hold a washing liquid and having a slice-intake portion and a slice-discharge portion and strainer means interposed between said portions for screening said slices and means for inducing a forced circulation of washing liquid in the tank and through said strainer means from said slice-intake portion to said slice-discharge portion; of a sonic-transducer positioned relative to said tank and of a resonant frequency to produce, when operated, cavitation of the washing liquid in said tank at said slice-intake portion thereof, whereby the effective action of said transducer on the potato slices diminishes as said slices move toward the discharge portion of said tank.

2. In a potato-chip producing apparatus, a tank adapted to contain a wash-liquid; a source of wash-liquid supply for the tank including means for maintaining a liquid level in said tank; means positioned to introduce slices of potatoes at one portion of said tank; means at another portion of the tank for discharging said slices therefrom;

a wash-liquid recirculating means including a pump having its intake side connected with the discharge portion of the tank and its discharge side to the said first portion of the tank, for washing said slices and moving them from their point of introduction to their point of discharge from the tank; means for guiding said slices in a path during their movement in said tank; and a sonic-transducer positioned at the slice introduction portion of said tank and below the liquid level therein and spaced from said point of introduction and the path of movement of said slices in the tank, said transducer having a resonant frequency to produce cavitation of the wash-liquid in said tank, whereby said slices move continuously away from said cavitation from their point of introduction into said tank to their discharge from said tank.

3. In a potato-chip producing apparatus, an elongated horizontally disposed tank adapted to contain a wash-liquid bath; a foraminated cylinder open at its ends and positioned horizontally in said tank to be partially submerged and mounted for rotation about its axis, at least one end of said cylinder terminating a considerable distance from the adjacent end of said tank; means at said last mentioned end of said tank for depositing slices of potatoes into said end of the tank, and means at the other end of the tank for receiving the slices from the adjacent end of said cylinder and discharging said slices from said tank; a pump having its inlet end connected with the discharge end of the tank; a fluid-pressure-actuated sonic transducer in said tank below the liquid level therein and below the point of deposit of the slices thereinto and in advance of the adjacent intake end of said cylinder and connected to the discharge side of said pump, and guide means spaced substantially from said transducer for directing said slices from the deposit means to the adjacent end of said cylinder.

4. The subject matter of claim 3 wherein said transducer is positioned to discharge the liquid, passing therethrough under pressure, into said tank in the direction of the discharge end of the tank.

5. The subject matter of claim 1 wherein the sonic transducer is liquid pressure operated and is submerged means, and wherein the liquid circulating means includes a pump having its discharge side connected to said transducer for actuating the latter.

References Cited in the file of this patent

UNITED STATES PATENTS

| | | |
|---|---|---|
| 2,171,398 | Hastert | Aug. 29, 1939 |
| 2,179,035 | Ferry | Nov. 7, 1939 |
| 2,495,295 | Spanier | Jan. 24, 1950 |
| 2,699,592 | Newman | Jan. 18, 1955 |

FOREIGN PATENTS

| | | |
|---|---|---|
| 790,671 | Great Britain | Feb. 12, 1958 |

UNITED STATES PATENT OFFICE
CERTIFICATE OF CORRECTION

Patent No. 3,026,885                          March 27, 1962

Bruce D. Eytinge

It is hereby certified that error appears in the above numbered patent requiring correction and that the said Letters Patent should read as corrected below.

Column 3, line 15, for "compressor" read -- compression --; column 6, line 13, after "submerged" insert -- within said tank forward of and remote from the strainer --.

Signed and sealed this 24th day of July 1962.

(SEAL)
Attest:

ERNEST W. SWIDER
Attesting Officer

DAVID L. LADD
Commissioner of Patents